(12) United States Patent
Van Sickle

(10) Patent No.: US 10,319,016 B2
(45) Date of Patent: Jun. 11, 2019

(54) MARKET PLACE SYSTEM, SERVER, AND APPLICATION FOR DISCOVERING AND PURCHASING PRODUCTS ONLINE

(71) Applicant: Caroline Van Sickle, Atlanta, GA (US)

(72) Inventor: Caroline Van Sickle, Atlanta, GA (US)

( * ) Notice: Subject to any disclaimer, the term of this patent is extended or adjusted under 35 U.S.C. 154(b) by 0 days.

(21) Appl. No.: 14/468,013

(22) Filed: Aug. 25, 2014

(65) Prior Publication Data

US 2015/0058106 A1 Feb. 26, 2015

Related U.S. Application Data

(60) Provisional application No. 61/870,038, filed on Aug. 26, 2013.

(51) Int. Cl.
| | | |
|---|---|---|
| *G06Q 30/00* | (2012.01) | |
| *G06Q 30/06* | (2012.01) | |
| *G06Q 30/02* | (2012.01) | |
| *H04L 29/08* | (2006.01) | |

(Continued)

(52) U.S. Cl.
CPC ......... *G06Q 30/0623* (2013.01); *G06F 16/00* (2019.01); *G06Q 30/0217* (2013.01); *G06Q 30/0269* (2013.01); *G06Q 30/0625* (2013.01); *G06Q 30/0633* (2013.01); *G06Q 30/0641* (2013.01); *G06Q 50/01* (2013.01); *H04L 67/22* (2013.01); *H04L 67/30* (2013.01)

(58) Field of Classification Search
CPC ............... G06Q 50/01; G06Q 30/0623; G06Q 30/0625; G06Q 30/0217; G06Q 30/0633; G06Q 30/0641; G06Q 30/0269; G06Q 30/0601–30/0645; H04L 67/30; H04L 67/22; G06F 16/00

USPC ............... 705/26.1–27.2, 14.19, 14.66, 319; 707/706

See application file for complete search history.

(56) References Cited

U.S. PATENT DOCUMENTS

| | | | | |
|---|---|---|---|---|
| 8,706,499 B2* | 4/2014 | Papakipos | ............... | G10L 25/54 701/31.5 |
| 9,189,811 B1* | 11/2015 | Bhosle | ............... | G06Q 30/0641 |

(Continued)

OTHER PUBLICATIONS https://web.archive.org/web/20120803035855/http://www.prettyinmypocket.com/.*

(Continued)

*Primary Examiner* — Jeffrey A. Smith
*Assistant Examiner* — Allison G Wood
(74) *Attorney, Agent, or Firm* — Benjamin Balser; Next IP Law Group

(57) ABSTRACT

A representative market place system that facilitates discovering and purchasing products online includes a market place server that is interconnected to a plurality of computing devices by way of a network. The market place server includes a processing device; and memory including a market place manager which has instructions that are executed by the processing device. The instructions include the logics of receiving and displaying a content from a user; associating at least one product with at least a portion of the content; storing the content and the at least one product in a database; and displaying the at least one product at the content. The at least one displayed product includes product information and is selectable by the user for placing the at least one selected product that is associated with the at least a portion of the content in an online shopping cart.

20 Claims, 15 Drawing Sheets

(51) Int. Cl.
    *G06Q 50/00*         (2012.01)
    *G06F 16/00*         (2019.01)

(56) References Cited

U.S. PATENT DOCUMENTS

| | | | | |
|---|---|---|---|---|
| 2003/0200144 A1* | 10/2003 | Antonucci | G06Q 30/02 | 705/14.28 |
| 2013/0346172 A1* | 12/2013 | Wu | G06Q 30/0214 | 705/14.16 |
| 2014/0012655 A1* | 1/2014 | Polak | G06Q 30/02 | 705/14.39 |
| 2014/0279039 A1* | 9/2014 | Systrom | G06Q 50/01 | 705/14.66 |
| 2015/0178681 A1* | 6/2015 | Agarwal | G06Q 10/101 | 705/26.8 |

OTHER PUBLICATIONS https://web.archive.org/web/20130814212752/http://prettyinmypocket.com/howitworks.*

Interview with Inventor; Feb. 3, 2013 (Feb. 3, 2016); accessed via: http://styleblueprint.com/atlanta/everyday/sb-faces-of-atlanta-caroline-van-sickle/.*

Call Centers: Edify. Bank Technology News. SourceMedia, Inc. (Dec. 1, 1996). (Year: 1996).*

* cited by examiner

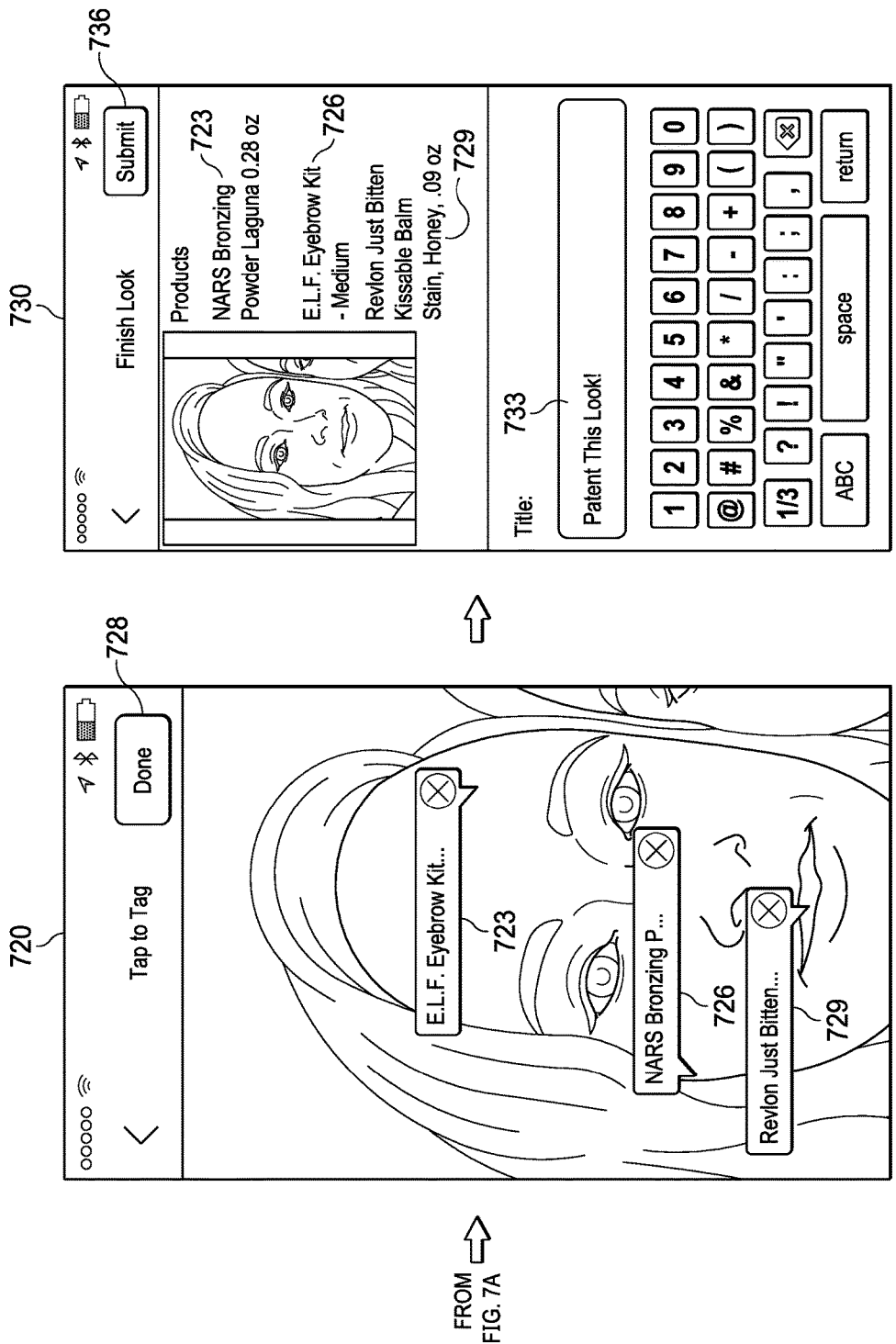

FIG. 11A

MARKET PLACE SYSTEM, SERVER, AND APPLICATION FOR DISCOVERING AND PURCHASING PRODUCTS ONLINE

CROSS REFERENCE TO RELATED APPLICATIONS

This application claims the benefit of U.S. provisional application entitled, "System and Method Rewarding Mobile Commerce Customers," having Ser. No. 61/870,038, filed on Aug. 26, 2013, all of which are entirely incorporated herein by reference.

TECHNICAL FIELD

The present disclosure is generally related to telecommunication systems and, more particularly, is related to systems and methods for discovering and purchasing products online.

BACKGROUND

More and more people are shopping online. However, many online shoppers are overwhelmed and discouraged because they are bombarded with a plethora of information, comments, and reviews related to products available online. Desirable in the art is an improved method of discovering and purchasing products online that would improve upon the conventional method.

SUMMARY

A representative market place system that facilitates discovering and purchasing products online includes a market place server that is interconnected to a plurality of computing devices by way of a network. The market place server includes a processing device; and memory including a market place manager which has instructions that are executed by the processing device. The instructions include the logics of receiving and displaying a content from a user; associating at least one product with at least a portion of the content; storing the content and the at least one product in a database; and displaying the at least one product at the content. The at least one displayed product includes product information and is selectable by the user for placing the at least one selected product that is associated with the at least a portion of the content in an online shopping cart.

Other systems, devices, methods, features of the invention will be or will become apparent to one skilled in the art upon examination of the following figures and detailed description. It is intended that all such systems, devices, methods, features be included within the scope of the invention, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, the reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which a market place server facilitates discovering and purchasing of products online.

Figure 1:
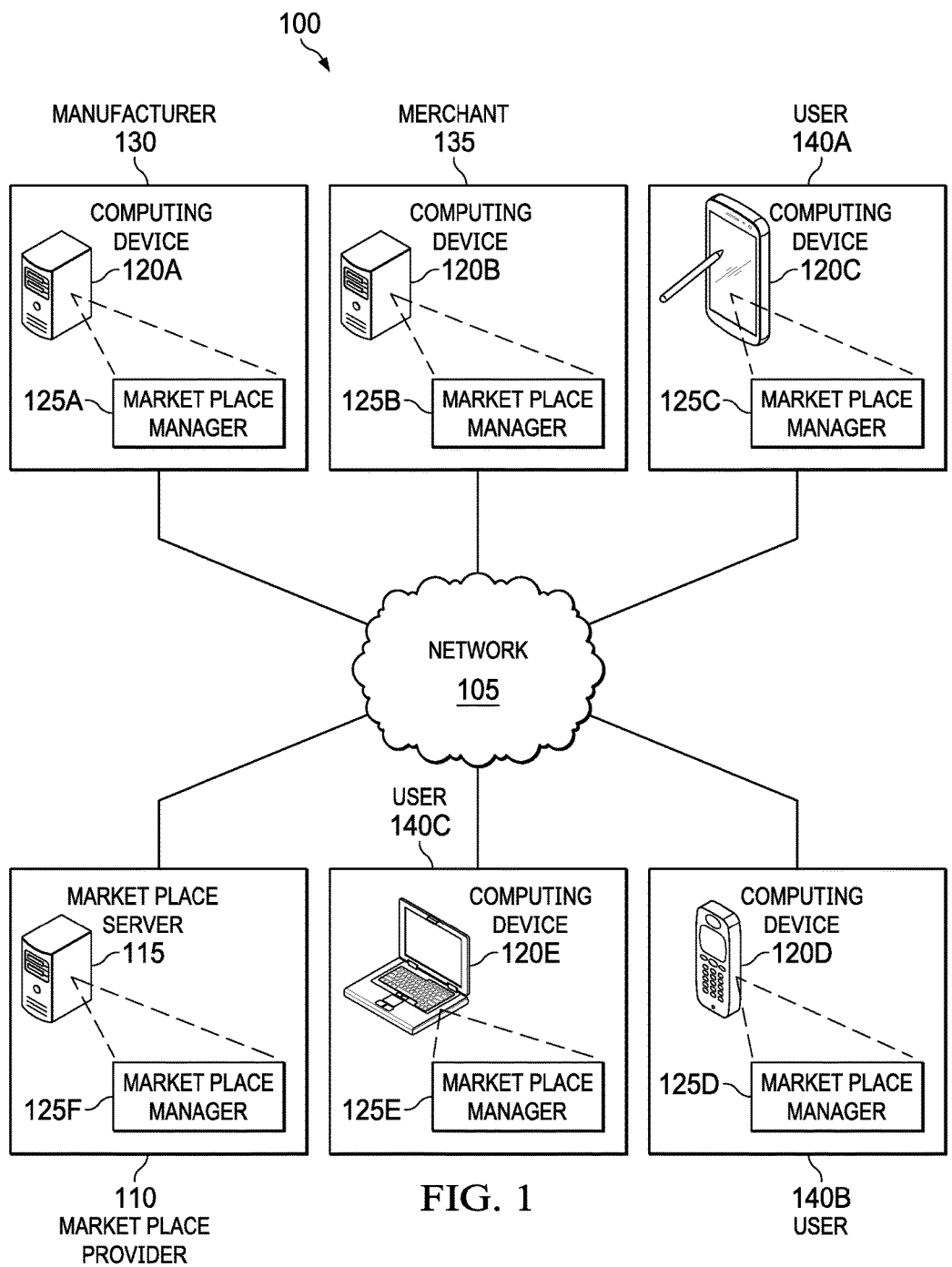
FIG. 1 is a block diagram that illustrates an embodiment of a system having a market place manager that allows a user to discover and purchase a product via a network.

FIG. 1 is a block diagram that illustrates an embodiment of a system 100 having a market place manager 125 that allows a user to discover and purchase a product 205 (FIG. 2) via a network 105. The user can be a registered member and a guest. The system 100 can include market place server 115 at a premise of a market place provider 110, and computing devices 120A-E at respective manufacturer premise 130, merchant premise 135, and customer premises/location 140A-C. The computing devices 120A-E can include, but not limited to, desktop computers, laptops, netbooks, smart phones, tablets, smart glasses, iPods, and smart watches.

Each market place server 115 and computing devices 120A-E is installed with and executes a market place manager 125A-F. The computing devices 120A-E can communication with the market place server 115 via the network 105, e.g., Internet, LAN, and WAN. The market place manager 125 simplifies the discovery and purchasing of a product 205 via a network 105. The market place manager 125 is further described in connection to the later FIGS.

Users can use the market place manager 125 to discover any products 205 available online, such as cosmetics, clothes, cars, recreational equipment, and so on. The present patent application will use cosmetic products 205 as an example of how the market place manager makes discovering and purchasing cosmetic products 205 the better.

The market place manager 125 facilitates discovery and purchase of beauty products 205 from multiple online and brick and mortar retailers and manufacturers 130, 135. For example, the market place manager 125 provides makeup/beauty contents 210 (FIG. 2) from multiple retailers 130 and experts/users and other content providers 140 and from reviews 215 (FIG. 2); can include products 205 from multiple retailers 130 to a shopping cart 305 (FIG. 3); can purchase goods that are shown in the contents 210 from multiple retailers 130 in one singular transaction 240 (FIG. 2); collect marketplace rewards 225 (FIG. 2) that are eligible for redemption through the market place; earn rewards 225 through shopping activity 240 (FIG. 2); and rewards 225 can be exchanged for tangible rewards, discounts, or offers from the multiple retailers.

Figure 2:
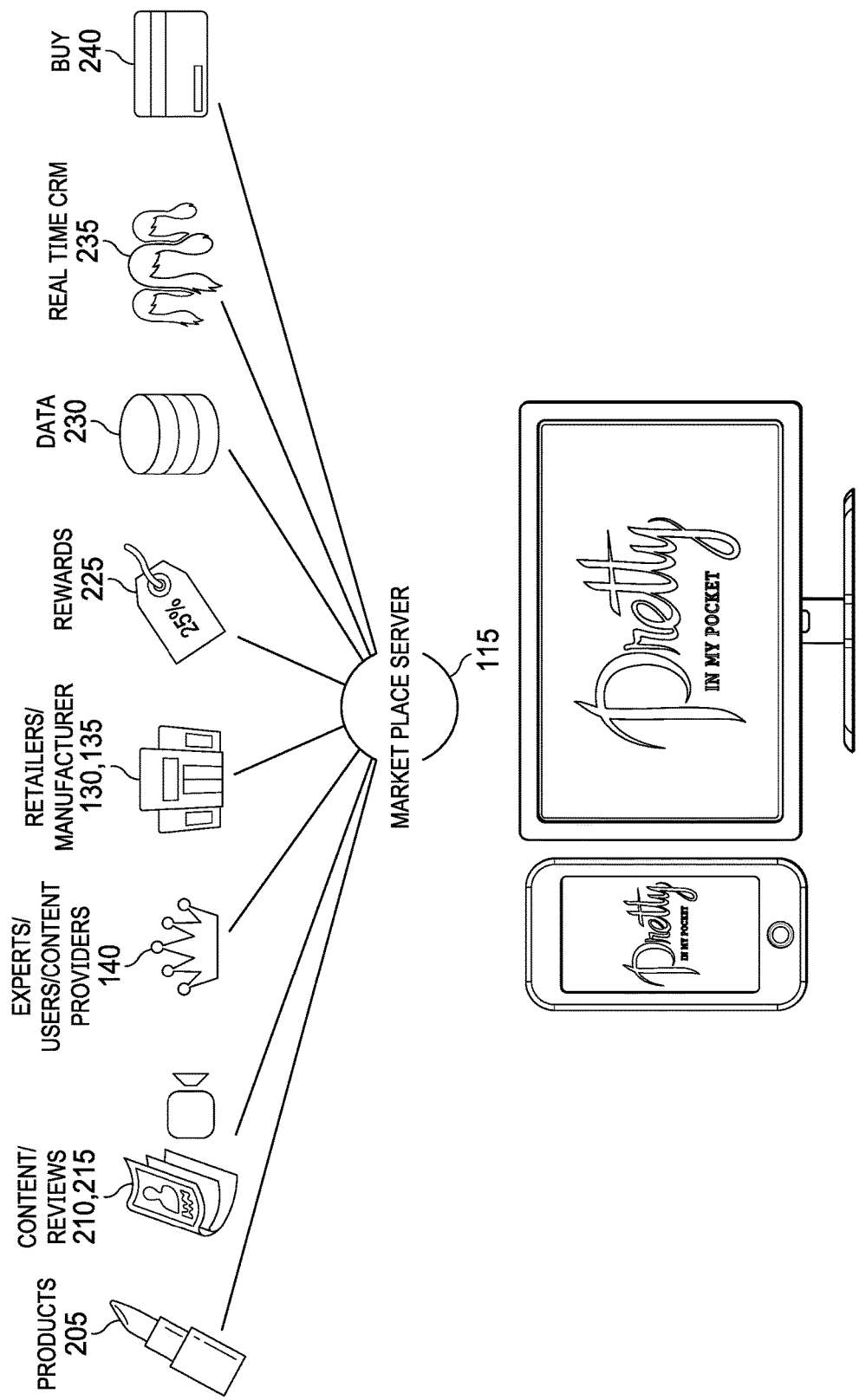
FIG. 2 is a high-level block diagram that illustrates an embodiment of a platform hub, such as that shown in FIG. 1.

FIG. 2 is a high-level data flow that illustrates a market place server 115 having a market place manager 125 to gather socially and contextually relevant information to discover and purchase products. The market place manager 125 gathers relevant information related to the products 205, content 210, reviews 215, experts/user/content providers 140, retailers 130, and manufacturer 135 to facilitate the user to discover and purchase products 205. The gathering process of the market place manger 125 is further described in FIG. 3.

The market place manager 125 can track product engaging activities of the user on the products and award rewards 225 to the user based on the product engaging activities of the user. The product engaging activities refer to activities that involve the user engaging with the product. The product engaging activities include, for example, receiving images, videos, blogging, podcast, documents, a rich site summary, a "like" comment from selecting a "like" button, a review of product, or a suggestion of a product to another user. The reward process of the market place manger 125 is further described in FIGS. 9-10.

The market place server 115 can electrically communicate with the real time customer relationship management (CRM) 235 to facilitate managing interactions with users and prospects based on the gathered information mentioned above. The market place server 115 can purchase goods that are shown in the contents 210 from multiple retailers 130 in one singular transaction 240.

Figure 3:
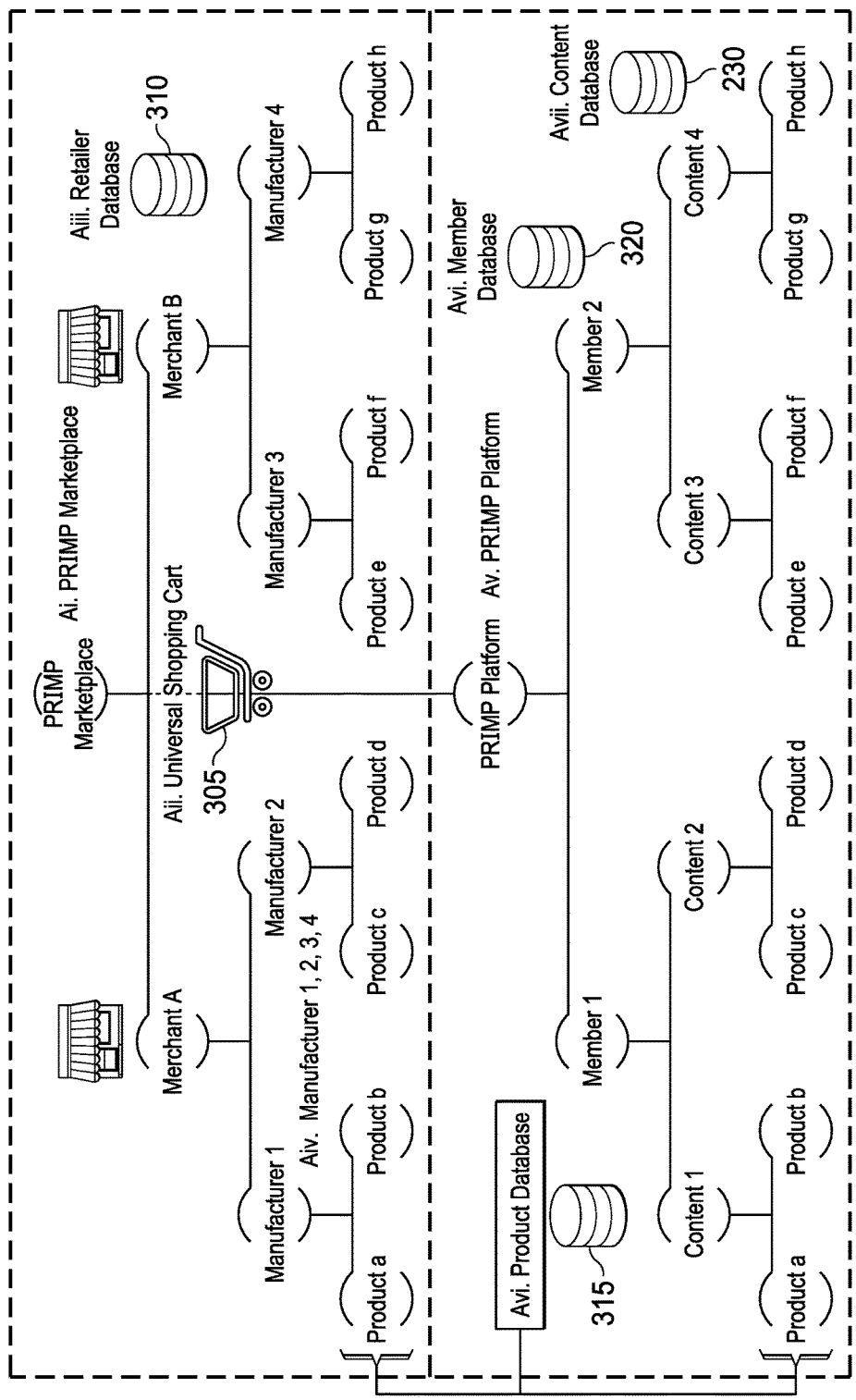
FIG. 3 is a block diagram that illustrates an embodiment of a system having databases that allows a market place manager, such as that shown in FIG. 1, that facilitates gathering socially and contextually relevant information associated with products.

FIG. 3 is a block diagram that illustrates an embodiment of a system 100 having databases that allows a market place manager 125 that facilitates gathering socially and contextually relevant information associated with products 205. The market place manager 125 gathers information associated with the products from the databases of the manufacturers and merchants 310 and stores the information at the product database 315 of the market place system 100. The market place manager 125 gathers information associated with the members and content activities that are conducted by the members 140 on the market place system 100, and stores the information at the member database 320 and the content database of the market place system 100, respectively. The market place manager 125 captures content data from experts/members/content providers 140 and retailers and manufacturers 130, 135. In order for content to be captured, the content must be created first by the experts/members/content providers 140 and retailers and manufacturers 130, 135.

In this example, the market place manager 125 captures both member data and content data. From member data, a member profile is created upon a member registering on the application. The member data captured from the member and stored in the member database 320 on the market place system 100. Upon member profile creation, the experts/members/content providers 140 and retailers and manufacturers 130, 135 can upload content and tag content with products from merchants stored in the product database 315 of the market place system 100. The content capture and creation are further described in connection to FIGS. 6-7.

The market place system 100 is the collection of multiple merchants 130, such as Merchant A and Merchant B, that sell multiple products 205, such as product a-g, from multiple manufacturers 135, such as manufacturer 1 and manufacturer 2, to registered members and/or non-members 140, such as member 1 and member 2), who can transact a purchase of the products 205 online via their mobile device and/or smartphones, tablet computers, laptops, or desktop computers 120, from the internet 105, directly from content 210, such as content 1-4. The content 210 can be an image or a video. The image or video displays how multiple products from different retailers, when combined, create a total look or outfit. Similar to how vegetables and beef are ingredients to make vegetable stew.

Today, if a buyer wants to purchase several goods from several different online merchants, the buyer must execute separate merchant transactions from each merchant retailer site. Therefore, buying a complete "look" directly from content, with the multiple products used to create the look, from multiple retailers, is simplified with the market place manager 125.

The market place manager 125 combines several merchants into a market place system 100 so that members 140 can consolidate purchases from multiple retailers into one singular transaction 140, directly from content 210 displayed on the computing device 120 by way of the market place manager 125. Each piece of content 140 is tagged with a specific product identification number, so that the members 140 can purchase the products shown in the content 210, from multiple retailers 130, in one transaction 240.

Members 140 can generate content on the application by uploading an image, and tagging the related products used to create the look, as in makeup look or a clothing outfit. For example, a member can take a picture of her face and "tag" the lipstick, eyeliner, and eye shadow she is wearing. The individual products, or ingredients so to speak, when shown together, generate a complete a "Look," that other members can buy from. The user assigns a title to the look along with a description, and then publishes the content on the market place system 100. The operation and functionality of the market place system 100 is further described below.

Figure 4:
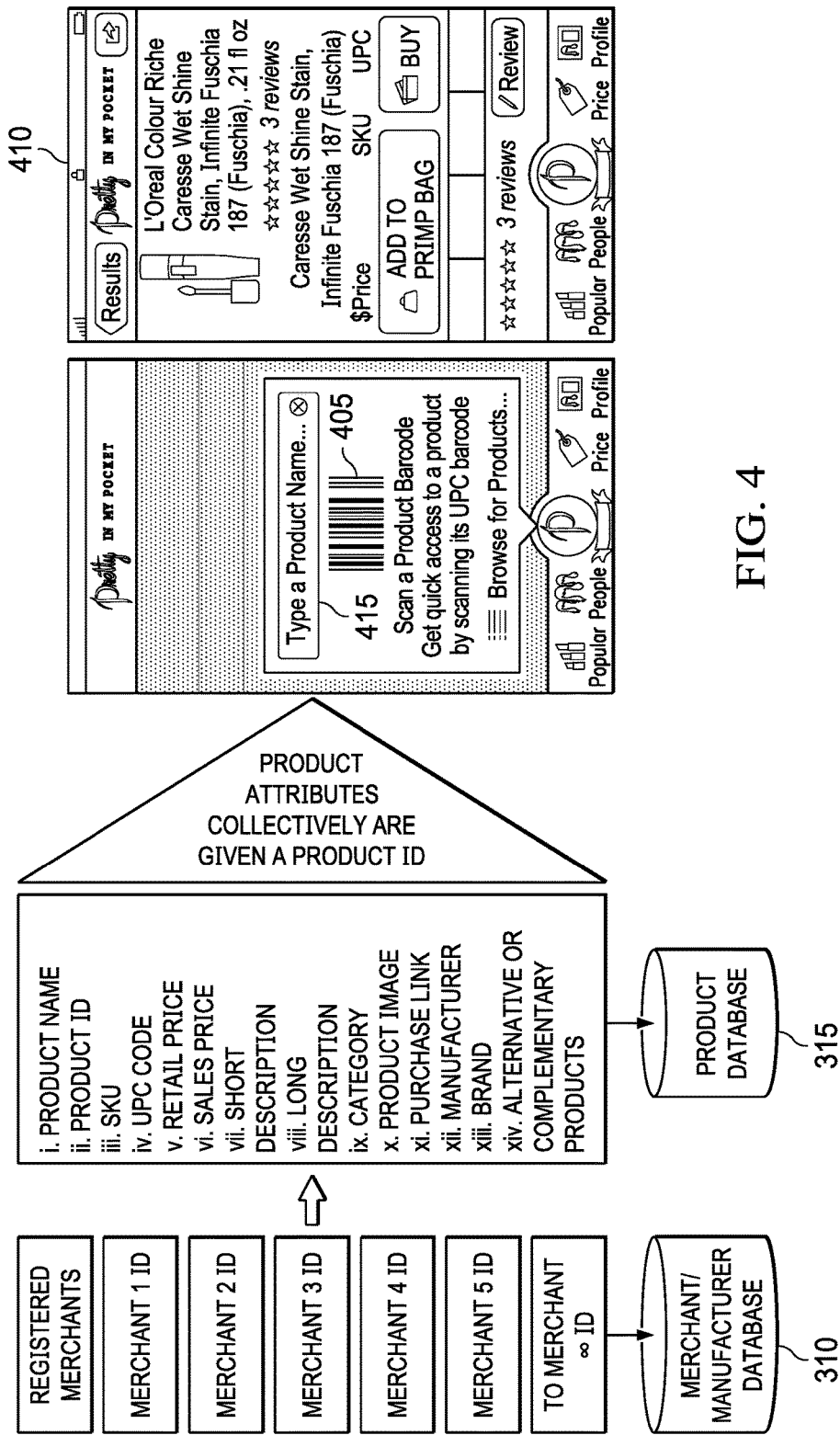
FIG. 4 is a data flow that illustrates an embodiment of the architecture, functionality, and/or operation of a market place manager, such as that shown in FIG. 1, that facilitates gathering socially and contextually relevant information associated with products.

FIG. 4 is a data flow that illustrates an embodiment of the architecture, functionality, and/or operation of a market place manager 125 that facilitates gathering socially and contextually relevant information associated with products. The market place manager 125 captures merchant data from merchants and manufacturers into the merchant/manufacturer database 310. The market place manager 125 assigns each merchant a unique merchant ID. The merchant ID encapsulates all characteristics that are relevant to the individual merchant, including by not limited to: merchant name, address, federal employer identification number (FEIN), bank name, bank routing number, bank account number, product identification number The market place manager 125 captures product data from merchants and manufacturers into the product database 315. The product data include individual characteristics of each product that can be desirable for marketing and sale, such as, but not limited to the following: product name, stock keeping unit (SKU), universal product code (UPC code), retail price, sales price, short description of the product, long description of the product category, product image, manufacturer, brand, alternative or complementary products, and merchant identification. The product attributes collectively can be assigned a product identification and a product barcode 405 can be generated to represent the product identification. A product data layout 410 is displayed responsive to the user inputting the product barcode or discovering the product via a search function 415 on the product database 315 of the market place system 100. The product data layout 410 can display at least one of the product attributes. The market place system 100 conveniently brings many products from different merchants and manufactures into one platform that the members 140 can access from their computing devices 120.

Figure 5:
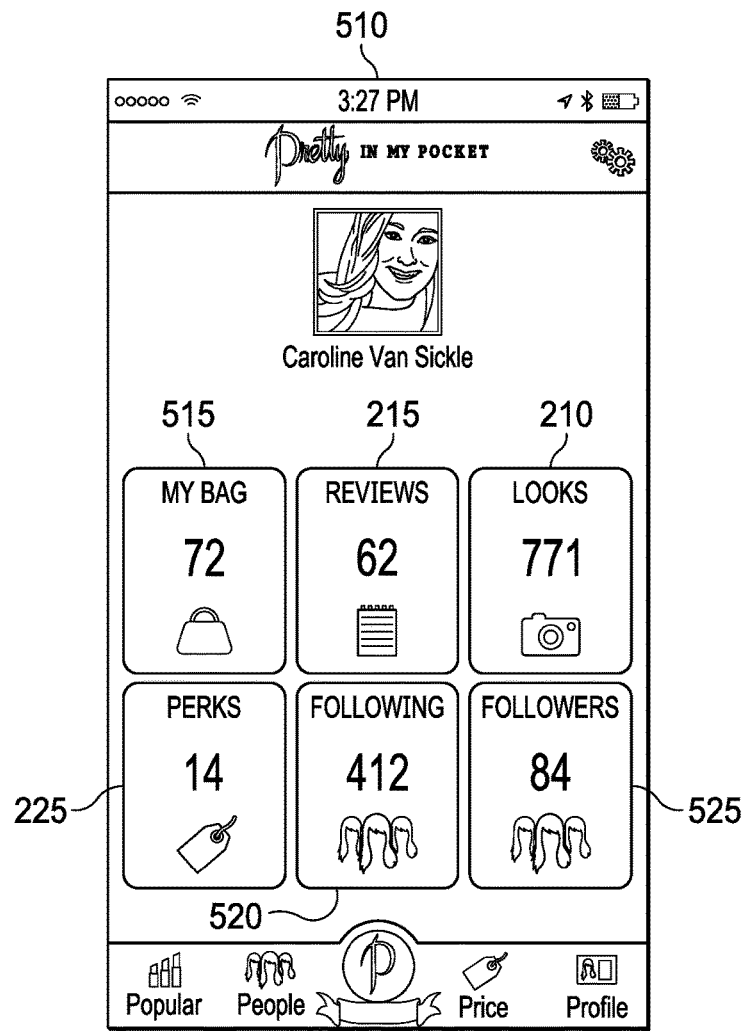
FIG. 5 is an interface layout that displays a profile by a market place manager, such as that shown in FIG. 1.

FIG. 5 is an interface layout 510 that displays a member profile by a market place manager 125. Upon registration, each member can be assigned a unique member ID and associates a member profile to the unique member ID. The member profile layout 510 displays member's activities on the market place system 100. The member's activities include a product bag 515, reviews 215, content and/or looks 210, reward and/or perks 225, following 520 and followers 525.

The product bag 515 shows 72 products that the member has added and/or purchased previously and intent to purchase in the future and has validated the product (through the word of mouth marketing) on the member's profile. The product bag 515 includes product ID's for each product the member has added and purchased to his/her bag, or added to his/her wishlist. The review icon shows 62 product reviews 215 that a member has published on the market place system 100. The Looks icon shows 771 content 210 that a member has created or added to the member profile. The member can associate the content 210 with specific product IDs that the member used to create the content.

The perks icon shows 14 rewards 225 the member has been rewarded based on the member's activities on the market place system 100. The reward process is further described in connection to FIGS. 9-10. The following icon shows 412 followings 520 that the member is following. The followers icons shows 84 followers 525 that follows the member.

Figures 6, 7, 8, 11:
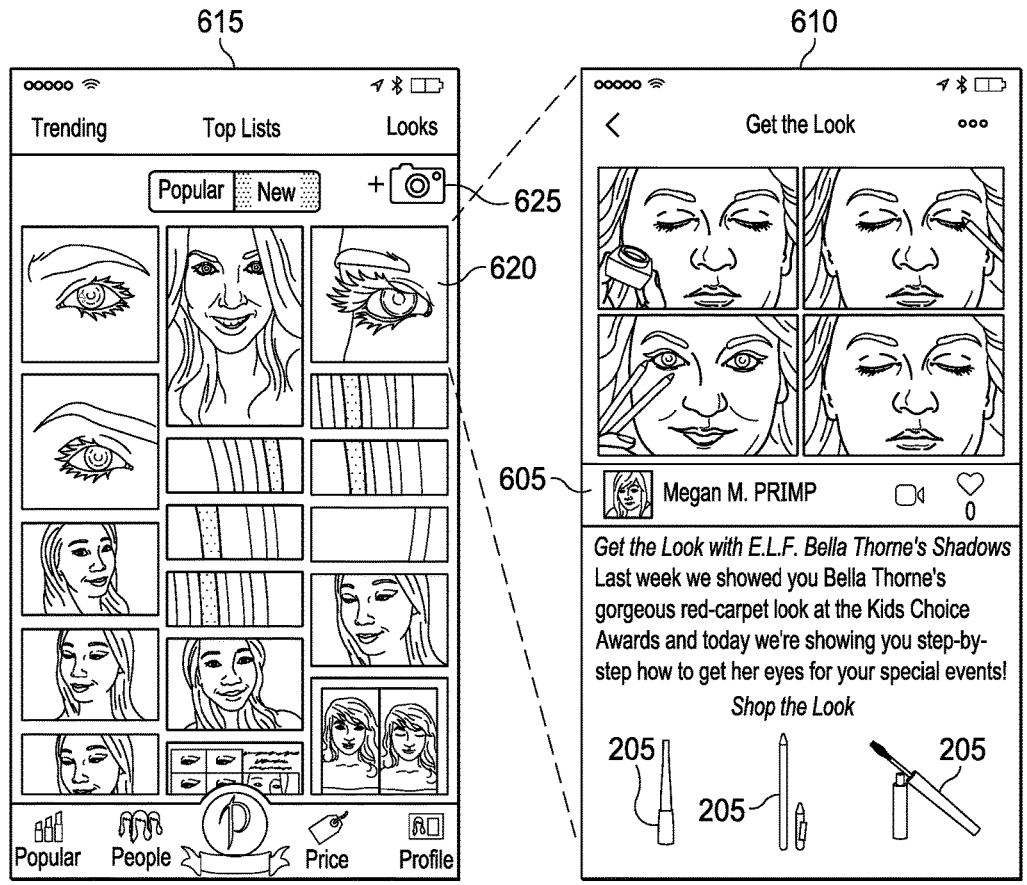
FIG. 6 is an interface layout that displays a content by a market place manager, such as that shown in FIG. 1.
FIG. 7 is a data flow that illustrates an embodiment of the architecture, functionality, and/or operation of a market place manager, such as that shown in FIG. 1, that facilitates creating a content.
FIG. 8 is a data flow that illustrates an embodiment of the architecture, functionality, and/or operation of a market place manager, such as that shown in FIG. 1, that facilitates purchasing products from a content.
FIG. 11 is a data flow that illustrates an embodiment of the architecture, functionality, and/or operation of a market place manager, such as that shown in FIG. 1, that facilitates tracking product engaging activities of a member on products.
Figure 7A:
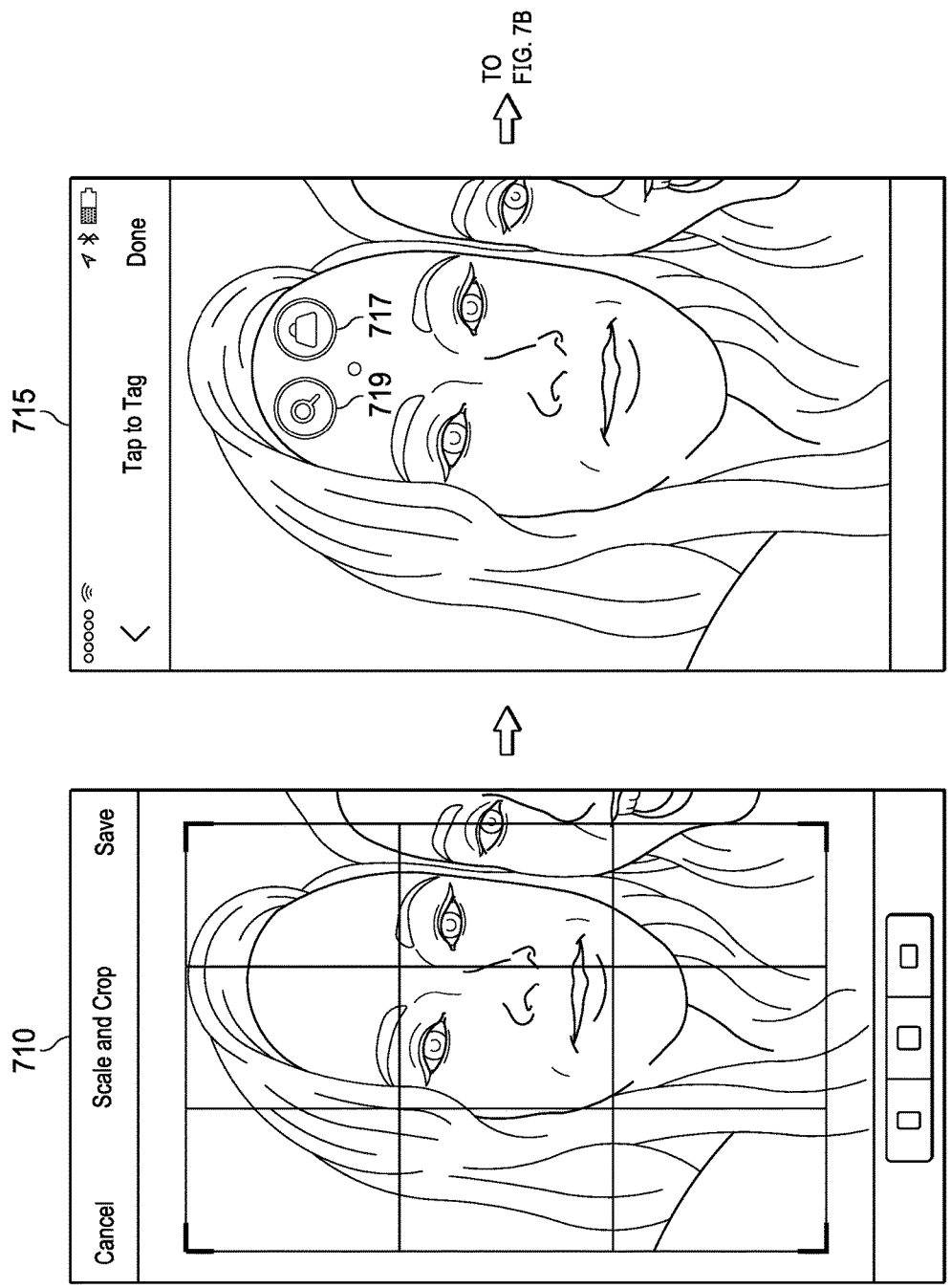
Figure 8A:
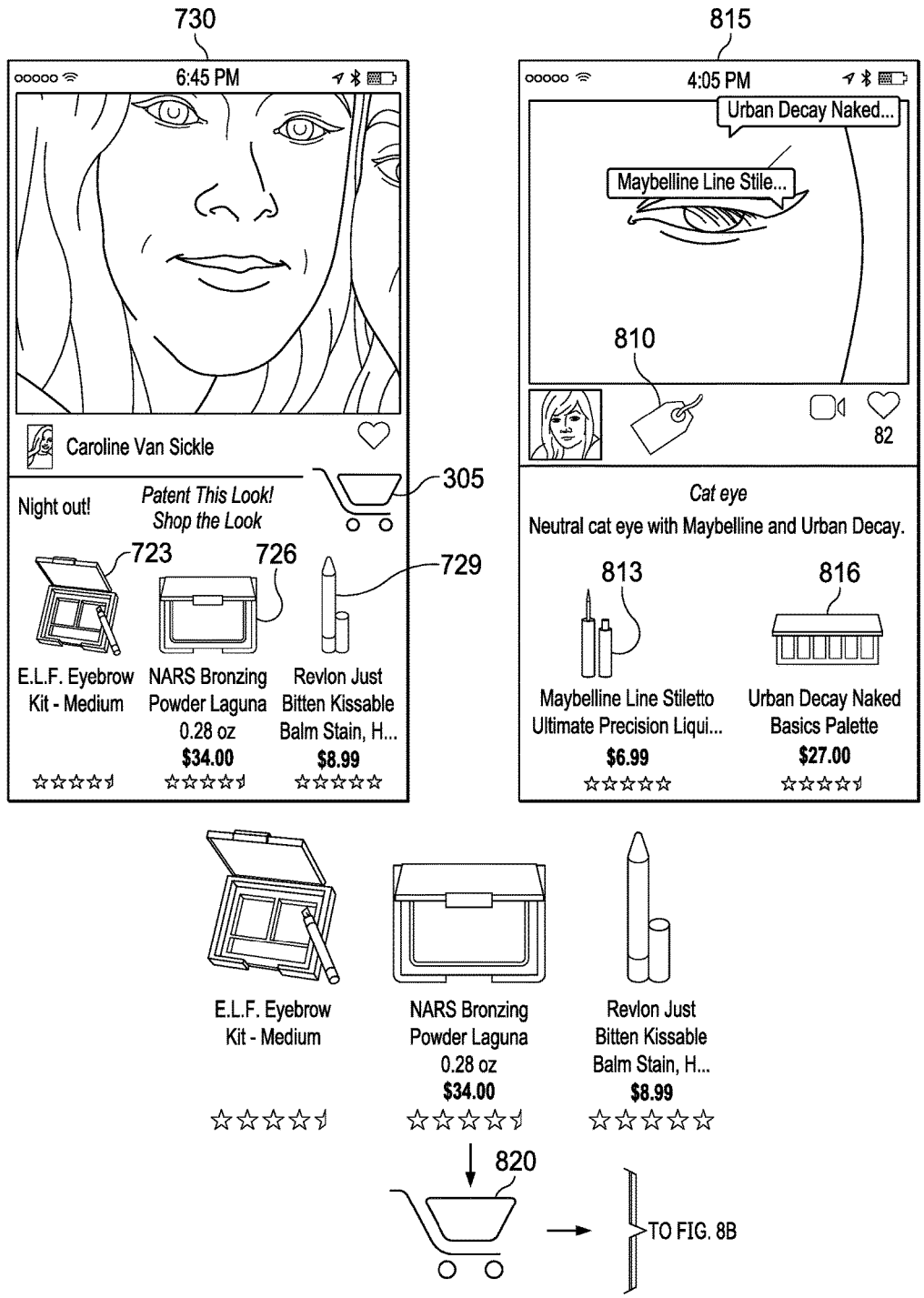
Figure 8B:
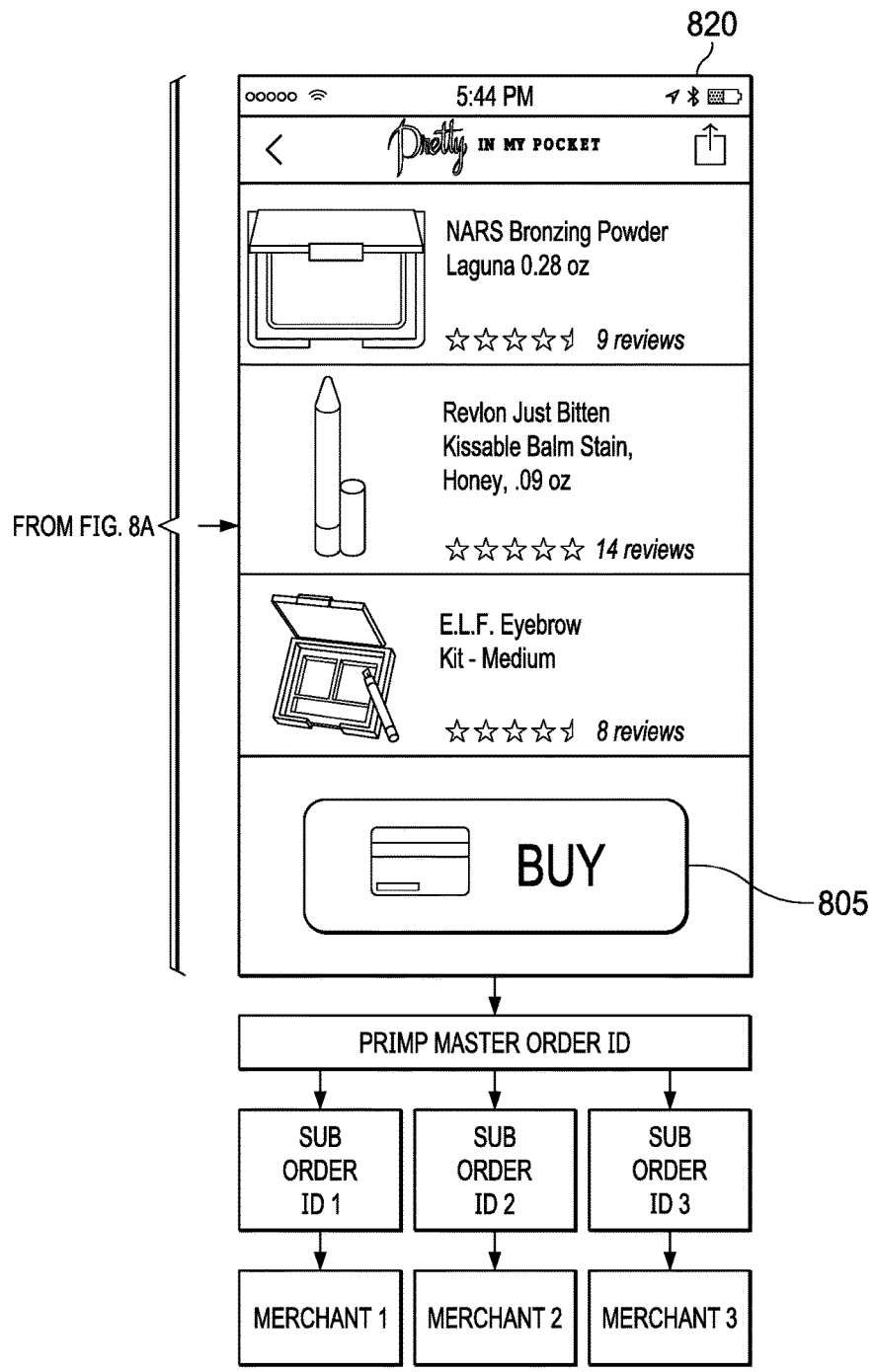

FIG. 6 is an interface layout that displays a content by a market place manager 125. A content feed 615 is displayed by the market place manager for members 140 to discover and search contents created by other members. The member 140 can select a content image 620 from the content feed 615 to expand into a content layout 610. The content layout 610 includes four images of a woman's face that shows the steps of applying makeup products on her face to achieve her "look." The content layout 610 also includes images of the makeup products 205 use to achieve her "look." The market place manager 125 associates the content layout 610 with the makeup products 205. The member 140 can add the content layout 610 from another member profile into his/her profile by, for example, clicking on the heart icon 605. The member 140 can retrieve the content layout 610 by clicking on the looks icon (FIG. 5) and searching a list of content 210 for the content layout 610 that was saved on his/her profile 510.

A content creation can start from the content feed by tapping the red camera button 625 at the content feed 615. The member 140 can choose to take a photo from a mobile camera built within a smartphone or tablet, or the member 140 can select an image from the mobile device's photo gallery of images stored on the mobile device or internet enabled image repository. Alternatively or additional, the member 140 can record a video to create a content. The content creation process is further described in connection to FIG. 7.

FIG. 7 is a data flow that illustrates an embodiment of the architecture, functionality, and/or operation of a market place manager 125 that facilitates creating a content 210. The market place manager 125 can receive and display an image 710 on a display device, such as a smart phone. The member 140 can crop the image 710 to a desired size.

Once the image 710 is saved, the market place manager 125 displays searching options using product database search 719 or member profile search 717 on the saved image 715. From the search result of the product database search 719 or member profile search 717, the market place manager 125 can associate at least one product with at least a portion of the content by the user.

In this example, the member 140 can tap on a woman's eyebrow, chin, and lips to tag with specific products 723, 726, 729 used to create the look captured in the image 710. The member 140 can click on the done button 728. Upon completion of tagging the content with specific products 723, 726, 729, the market place manager 125 displays a draft content layout 730 of the image 710 associated with the products 723, 726, 729. The content layout 730 shows the image 710 on the left and a list of the products 723, 726, 729 on the right of the layout 730. The member 140 can name the content layout 730 at the title section 733 and provide a description, (not shown) and then submits the content layout 730 to the market place server 115 by way of clicking on a submit button 736. The market place server 115 saves the content layout 730 having the image 710 associated with products 723, 726, 729 to the content database 230 and assigns a unique content ID to the image 710. The naming of the content can coincide with occasions, such as makeup for wedding, birthdays, interviews, professional meetings, funerals, church, etc., with seasons, and a person's mood.

FIG. 8 is a data flow that illustrates an embodiment of the architecture, functionality, and/or operation of a market place manager 125 that facilitates purchasing products 723, 726, 729 from a content 730. The market place manager 125 can retrieve and display the content 730 from the product database 315 (FIG. 3) or from the member's profile 510 (FIG. 5). A member 140 can click on the products 723, 726, 729 to purchase the products from the displayed content 730. A shopping cart button is placed at the content and can be selectable by the member for placing all three products that are associated with the content in an online shopping cart 820.

In this example, all three products 723, 726, 729 are added to the cart 305 and the member 140 can click on a buy button to initiate a financial transaction to purchase the products. Upon clicking on the buy button 805, the market place manager 125 collects the member's payment information. The products can come from three merchants but can be assigned a master order ID. The different products and their respective merchants are then assigned a separate sub-order ID that is associated with the master order ID.

The sub-order ID is sent from the market place server 115 to the merchant computing device 120B (FIG. 1) with all of the member payment credentials and member shipping details so the merchant can fulfill the order from the order placed in the market place system 100. The market place manager 125 can display a discount icon 810 at the content 815. The discount icon indicates to the member 140 that a discount is given upon the purchase the products 813, 816 associated with the content 815.

Figure 9:
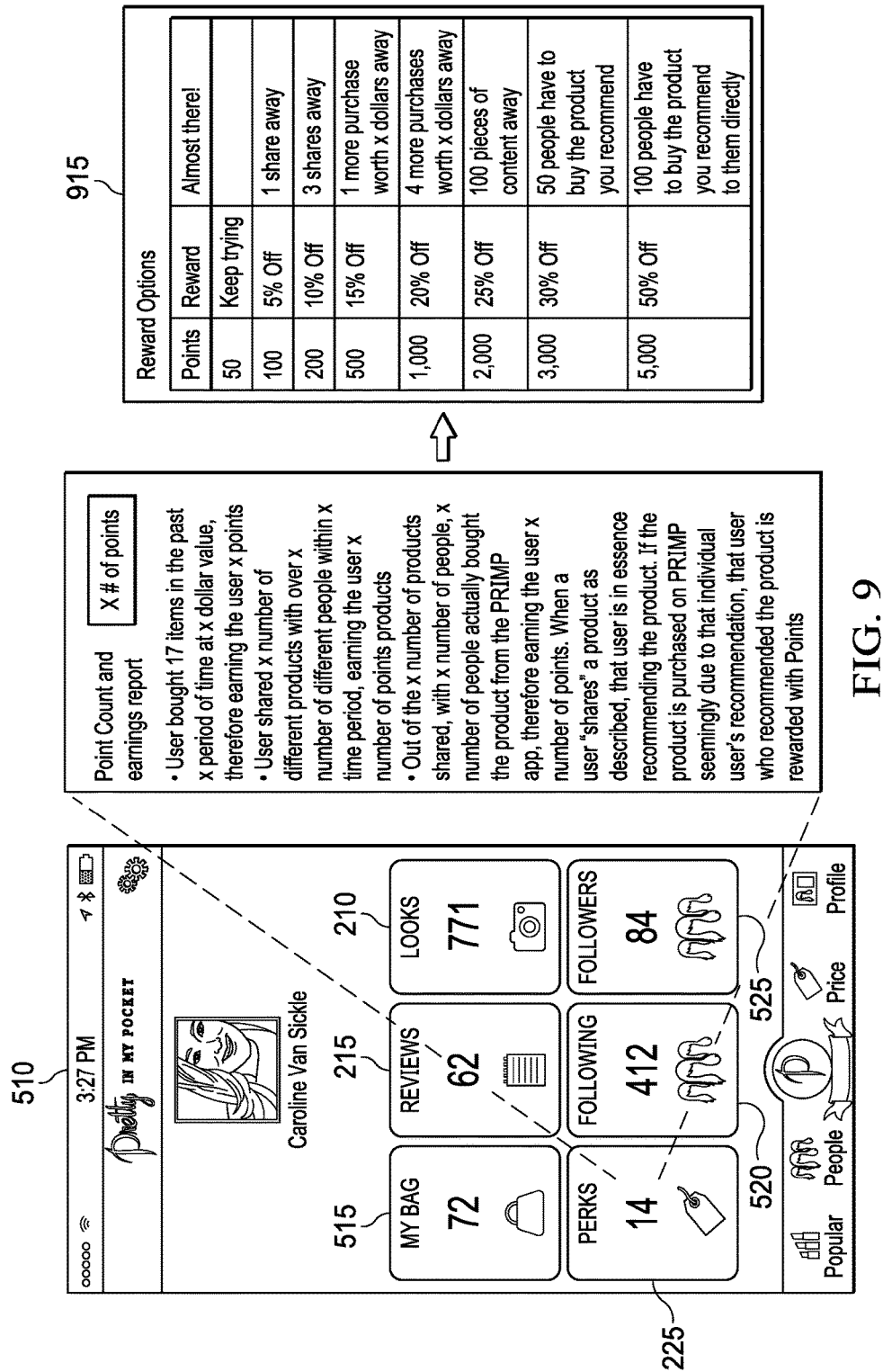
FIG. 9 is a data flow that illustrates an embodiment of the architecture, functionality, and/or operation of a market place manager, such as that shown in FIG. 1, that facilitates tracking and awarding rewards earned by users.

FIG. 9 is a data flow that illustrates an embodiment of the architecture, functionality, and/or operation of a market place manager 125 that facilitates tracking and awarding rewards earned by members 140. The market place manager 125 can track product engaging activities of the members 140 on the product 205 (FIG. 2). The product engaging activities refer to activities that involve a member 140 engaging with the product 205. The market place manager 125 can award reward(s) to an account of the member 140 based on the tracked product engaging activities. Such product engaging activities include receiving images, videos, blogging, podcast, documents, a rich site summary, a "like" comment from selecting a "like" button, a review of product, or a suggestion of a product to another user.

The market place manager 125 can store the product engaging activity of the members and track the number of times the product engaging activity is clicked on, viewed, or watched by other members 140. The market place manager 125 can award the reward(s) 225 to an account of the member 140 based on the tracked the number of times the product engaging activity is clicked on, viewed, or watched by other members 140. In this example, the rewards 225 can be awarded in reward points and can later be converted in certain percentage discounts as shown in reward options 915.

Alternatively or additionally, the member 140 can earn rewards 225 by the member 140 buying products in the past in a certain period of time at certain dollar value, therefore earning the member certain points. Alternatively or additionally, the member 140 can share X numbers of different products with over X number of different people within X time period, earning the member certain number of points products. Alternatively or additionally, out of the x number of products shared, with x number of people, and x number of people actually bought the product from the market place system 100, thereby earning the user x number of points.

When the member 140 "shares" a product as described previously, that member 140 is recommending the product 205 to others. If the product 205 is purchased on the market place system 100 seemingly due to the member's recommendation, that member who recommended the product is awarded with rewards 225. The reward can include at least one of discounts, free shipping, money back, commission on the sale, and free products.

Figure 10:
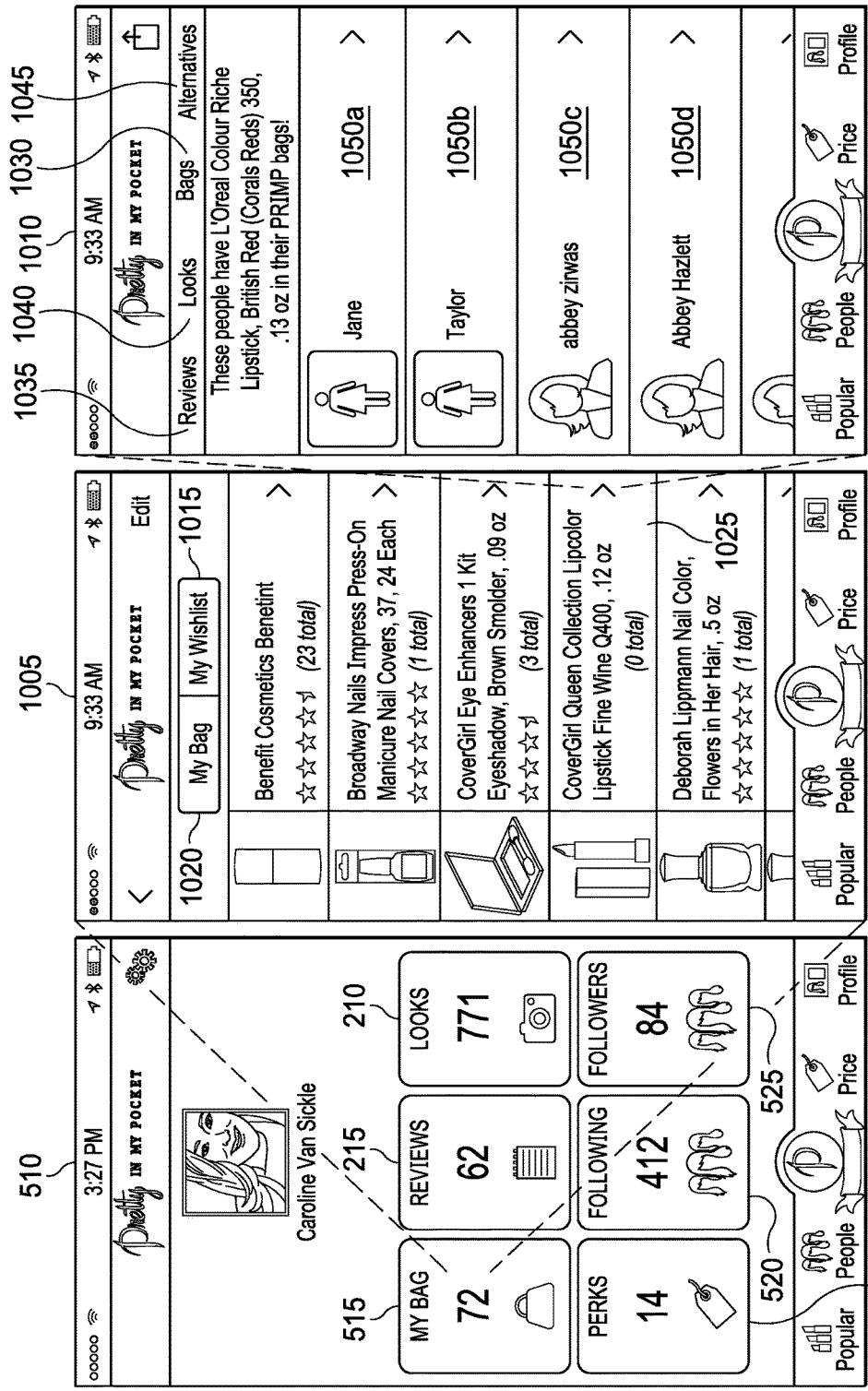
FIG. 10 is a data flow that illustrates an embodiment of the architecture, functionality, and/or operation of a market place manager, such as that shown in FIG. 1, that facilitates tracking product engaging activities of a member on products.
Figure 11B:
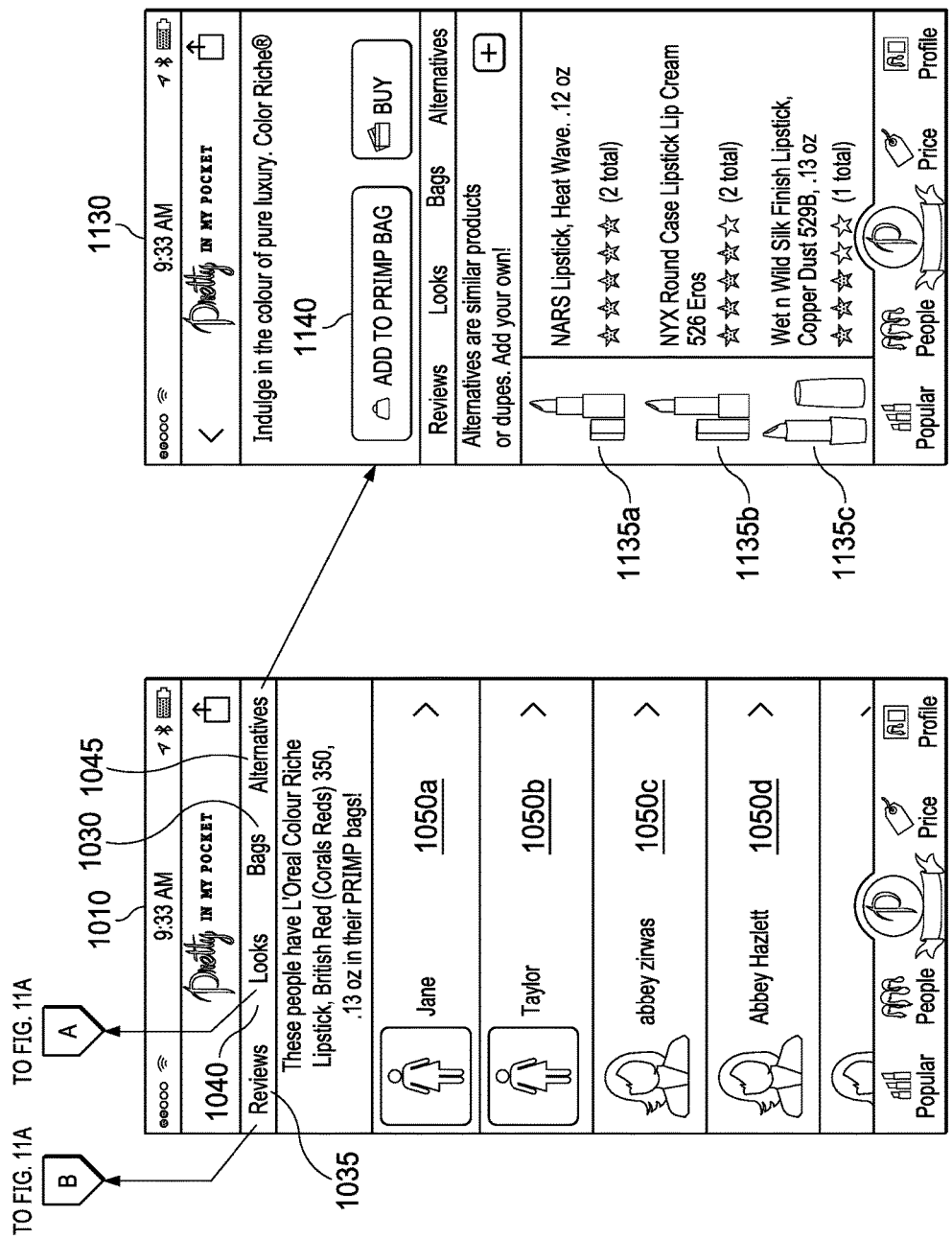

FIG. 10 is a data flow that illustrates an embodiment of the architecture, functionality, and/or operation of a market place manager 125 that facilitates tracking product engaging activities of a member on products. The member 140 of the profile 510 or another member can view the profile 510, which includes a product bag 515 that can be expanded upon the member 140 clicking on it. The expanded product bag 1005 includes products that have been purchased upon clicking on my bag button 102 or products that are on the member's wishlist upon clicking on my wishlist button 1015. It should be noted that the member 140 receive a reward for adding the products 205 (FIG. 2) into his/her product bag 515.

In this example, the product 1025 in the member's product bag 515 is selected and expanded to a product engaging screen 1010 that displays other members 1050a-d having the product 1025 in their bags responsive to the member 140 selecting the bags button 1030. The member of the profile 510 can receive a reward responsive to the member 140 selecting the product 1025 in the member's product bag 515.

By listing other members 1050a-d having the product 1025 in their bags, the member 140 viewing this is informed that other members 1050a-d liked, purchased, and/or used the product 1025, and can search and select a member on the list of other members 1050a-d to read that member's reviews and other postings on the product 1025. The selected member can receive a reward responsive to the member 140 selecting him/her on the list of other members 1050a-d.

Figure 11A:
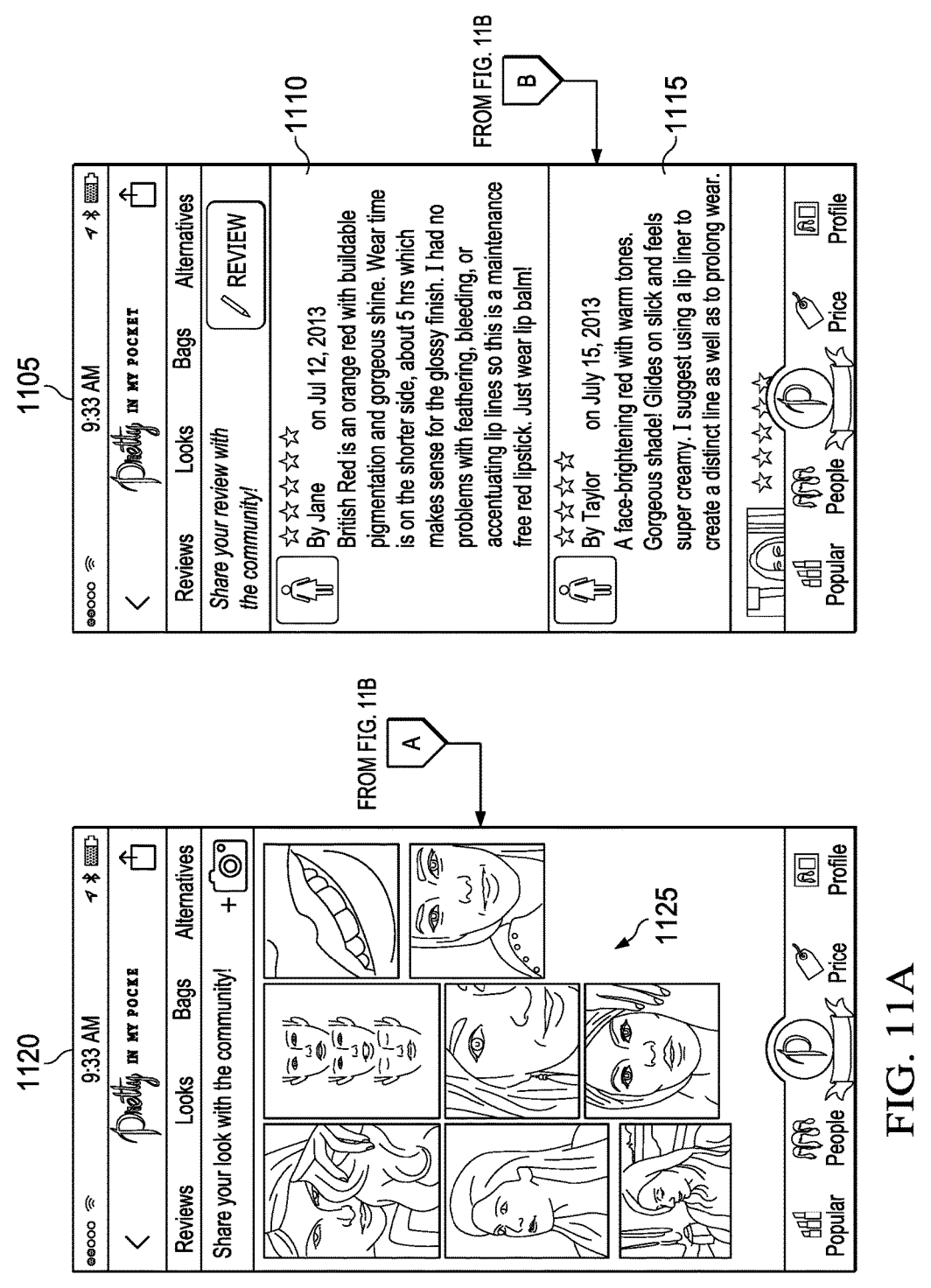

FIG. 11 is a data flow that illustrates an embodiment of the architecture, functionality, and/or operation of a market place manager 125 that facilitates tracking product engaging activities of a member on products. A product engaging screen 1010 can display reviews 1105, looks 1120, bags 1010 of other members, and alternatives 1130 of the product by selecting on the reviews button 1035, looks button 1040, bags button 1030, and alternatives button 1045. The member 140 viewing the reviews 1105 is informed by other members 1050a-d who provided comments about the product 1025, and can provide his/her own reviews on the product, thereby earning the member can a reward.

The member 140 viewing the looks 1120 can see images and/or videos that members posted about the product 1025 on the market place system 100, and can provide his/her own images and/or videos on the product, thereby earning the member can a reward. If the member 140 selects the images and/or videos, the member who posted the images and/or videos also earns a reward. The member 140 viewing the alternatives 1130 can see other products that are comparable to the product 1025 and stored on the market place system 100.

Figure 12:
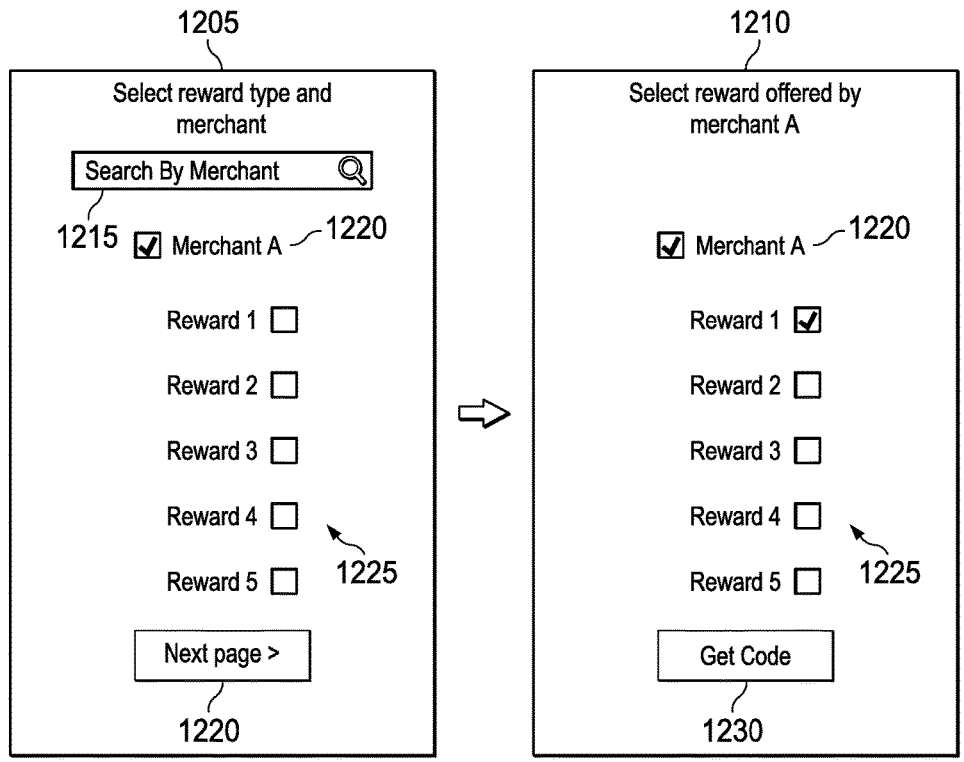
FIG. 12 is a data flow that illustrates an embodiment of the architecture, functionality, and/or operation of a market place manager, such as that shown in FIG. 1, that facilitates converting rewards earned by a user into a certain type of reward for a certain merchant.

FIG. 12 is a data flow that illustrates an embodiment of the architecture, functionality, and/or operation of a market place manager that facilitates converting rewards earned by a member 140 into a certain type of reward for a certain merchant. The rewards 225 can be converted to a certain type of rewards for a certain merchant. In this example, the reward interface 1205 includes a search input 1215 that enables the member 140 to search for a certain merchant at search input 1215. The market place manager 125 displays the discovered merchant from the search. In this example, merchant A 1220 was selected by the member 140 and a list of different types of rewards 1225 associated with the merchant A 1220 are displayed.

The member 140 can click on the next page button 1220, which the market place manager 125 then displays another reward interface 1210 that enables the member 140 to select from the list of different types of rewards 1225. In this example, the member 140 selected reward 1 and can click on the get code button 1030 to obtain a code that can be discounts, free shipping, money back, commission on the sale, and free products. Some codes can be applied during the buying process to apply the reward and others can be submitted with the merchant to receive the rewards.

Figure 13:
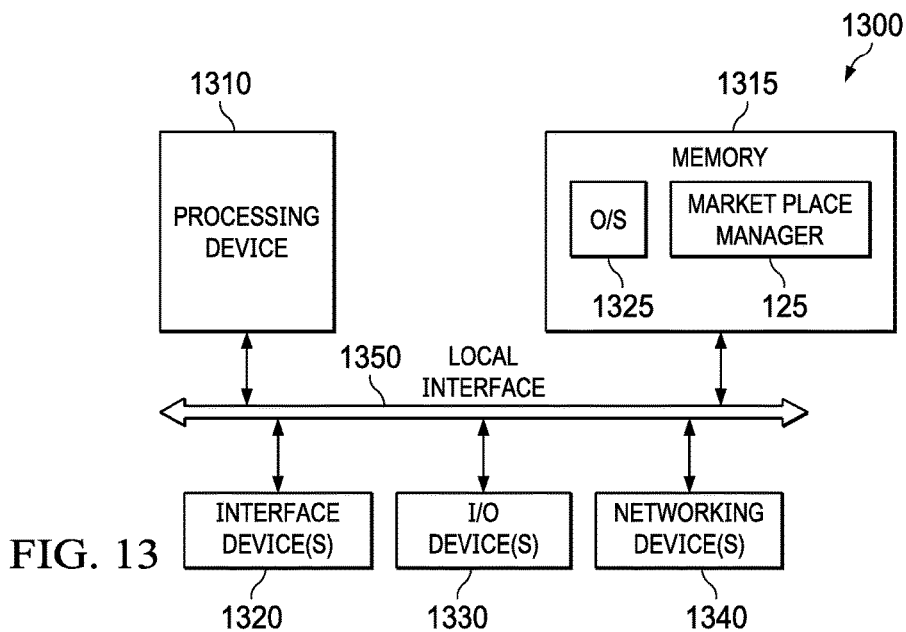
FIG. 13 is a block diagram illustrating an exemplary architecture for a generic computer that is similar to the architecture of the computing device, local server and central server having a match manager, such as that shown in FIG. 1.

FIG. 13 is a block diagram illustrating an exemplary architecture for a generic computer 1300 that is similar to the architecture of the computing devices 120, such as that shown in FIG. 1. As indicated in FIG. 13, the computing generic computer 1200 comprises a processing device 1310, memory 1315, one or more user interface devices 1320, one or more I/O devices 1330, and one or more networking devices 1340, each of which is connected to a local interface 1350. The processing device 1310 can include any custom made or commercially available processor, a central processing unit (CPU) or an auxiliary processor among several processors associated with the generic computer 1300, a semiconductor based microprocessor (in the form of a microchip), or a macroprocessor. The memory 1315 can include any one or a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 1320 comprise those components with which the user (e.g., administrator) can interact with the generic computer 1300. Where the generic computer 1300 comprises a server computer or similar device, these components can comprise those typically used in conjunction with a PC such as a keyboard, mouse, touch sensitive graphic screen and visual gesture sensors.

The one or more I/O devices 1330 comprise components used to facilitate connection of the generic computer 1300 to other devices and therefore, for instance, comprise one or more serial, parallel, small system interface (SCSI), universal serial bus (USB), or IEEE 1394 (e.g., Firewire™) connection elements. The networking devices 1340 comprise the various components used to transmit and/or receive data over networks (not shown), where provided. By way of example, the networking devices 1340 include a device that can communicate both inputs and outputs, for instance, a modulator/demodulator (e.g., modem), a radio frequency (RF), infrared (IR), WiFi or cellular broadband (4G, LTE, 3G, etc.) transceiver, a telephonic interface, a bridge, a router, as well as a network card, etc.

The memory 1315 normally comprises various programs (in software and/or firmware) including an operating system (O/S) 1325 and the market place manager 125 described above. The O/S 1325 controls the execution of programs, and provides scheduling, input-output control, file and data management, memory management, and communication control and related services.

The systems and methods disclosed herein can be implemented in software, hardware, or a combination thereof. In some embodiments, the system and/or method is implemented in software that is stored in a memory and that is executed by a suitable microprocessor (g) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example, but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

Note that the computer-readable medium could even be paper or another suitable medium on which the program is printed. Using such a medium, the program can be electronically captured (using, for instance, optical scanning of the paper or other medium), compiled, interpreted or otherwise processed in a suitable manner, and then stored in a computer memory. In addition, the scope of the certain embodiments of the present disclosure includes embodying the functionality of the preferred embodiments of the present disclosure in logic embodied in hardware or software-configured mediums.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

Therefore, having thus described the disclosure, at least the following is claimed:

1. A market place system that facilitates discovering and purchasing products online comprising:
   at least one mobile app that communicates in the market place system by way of a network; and
   a market place server that is interconnected to a plurality of computing devices by way of the network, wherein the market place server includes a processing device; and
   memory including a market place manager which has instructions that are executed by the processing device, the instructions including the following logics of:

storing product information related to at least one product in a database, wherein the product information includes a product identification number;

generating and storing at least one unique user ID of a user in the database based on receiving a user input from the at least one mobile app;

gathering socially and contextually relevant information associated with products created by content providers, wherein the socially and contextually relevant information includes product reviews and content images;

providing profiles of the content providers on an online marketplace, wherein each profile includes a product bag that includes products that a content provider added to the product bag, a review folder that includes product reviews that the content provider has published on the online marketplace, and a looks folder that includes content images of the content provider with the products; and providing a content feed that displays a list of gathered socially and contextually relevant information created by the content providers;

tracking and storing at least one product engaging activity in the database based on the user input from the at least one mobile app;

wherein the product engaging activity refers to an activity at the mobile app that includes receiving the user input that reflects a user engaging with the at least one product, wherein the product engaging activity includes at least one of the following activities: browsing, providing and/or receiving images, videos, blogging, podcast, documents, a rich site summary, a "like" comment from selecting a "like" button, a review of a product, a sharing or a suggesting of a product to another user, and purchasing of a product, and wherein the logic of tracking the at least one product engaging activity is accomplished by the market place server tracking the number of times that the product engaging activity is performed, associating the tracked number of times that the product engaging activity is performed with the at least one unique user ID, and associating the tracked number of times that the product engaging activity is performed with the product identification number in connection with the product information related to the at least one product; and configuring the stored product information to be associated with the at least one product at the at least one mobile app, wherein the at least one product is selectable by a user input for placing the selected product in an online shopping cart, wherein the online shopping cart facilitates an in-app purchase of the selected at least one product.

2. The market place system as defined in claim 1, wherein the market place manager has instructions that include the logics of:

creating a user profile that is associated with the at least one unique user ID;

associating the user profile with the at least one product engaging activity and the at least one product that has been purchased or is intended to be purchased based on the user input from the mobile app; and providing searching options for the at least one product engaging activity that enables the mobile app to search the at least one product from the database or the at least one product that is associated with the user profile.

3. The market place system as defined in claim 2, wherein the market place manager has instructions that include the logics of:

retrieving a stored content that is associated with the at least one product from the database or from the user profile;

displaying the retrieved content and a shopping cart button at the retrieved content;

responsive to selecting the shopping cart button, placing the at least one product that is associated with the content in the online shopping cart.

4. The market place system as defined in claim 2, wherein the logic of configuring the product information to be associated with the at least one product is achieved by way of the following logics:

receiving a selected portion of content from the user input, receiving search criteria from the user input, searching information stored in the database or from the user profile using the received search criteria, providing a list of at least one discovered product associated with the at least one unique user ID based on the result of the searching, receiving an indication that the at least one product is selected, and linking the selected portion of the content with the at least one unique user ID that is associated with the at least one discovered and selected product.

5. The market place system as defined in claim 1, wherein the market place manager has instructions that include the logics of:

configuring the at least one product to be associated with a shopping cart button, wherein the shopping cart button is selectable by the user input for placing the at least one product in an online shopping cart;

configuring the at least one product to be associated with a buy button at the online shopping cart, wherein the buy button is selectable by the user input for purchasing the at least one product that is placed in the online shopping cart; and responsive to selecting the buy button, initiating a financial transaction to purchase the at least one product that is placed in the online shopping cart.

6. The market place system as defined in claim 1, wherein the at least one product engaging activity includes providing images or videos.

7. The market place system as defined in claim 1, wherein the at least one product engaging activity is related to cosmetics, household goods, pet goods, baby goods, apparel, culinary equipment, cars, food, and recreational equipment.

8. The market place system as defined in claim 1, wherein the market place manager has instructions that include the logics of:

gathering information about the at least one product and about a merchant or manufacturer from a plurality of computing devices that is associated with at least one merchant or at least one manufacturer;

associating the at least one unique user ID with the gathered information; and storing the gathered information in the database.

9. The market place system as defined in claim 1, wherein the market place manager has instructions that further include the logic of displaying a discount indicia associated with the at least one product engaging activity, wherein the discount indicia indicates at the mobile app that a discount is given upon the purchase of the at least one product associated with the product engaging activity.

10. The market place system as defined in claim 1, wherein the market place manager has instructions that further include the logics of:
awarding at least one reward to an account of the user based on the tracked product engaging activities.

11. The market place system as defined in claim 10, wherein the market place manager has instructions that further include the logics of:
storing the at least one product engaging activity;
tracking the number of times the product engaging activity is clicked on, viewed, or watched by another user profile;
awarding at least one reward to an account of the user based on the tracked the number of times the product engaging activity is clicked on, viewed, or watched by another user profile.

12. The market place system as defined in claim 10, wherein the market place manager has instructions that further include the logic of converting the reward to a certain type of rewards for a certain merchant.

13. The market place system as defined in claim 12, wherein the reward includes at least one of discounts, free shipping, money back, commission on the sale, and free products.

14. A market place server that facilitates discovering and purchasing products online and is interconnected to a plurality of computing devices by way of a network, the market place server comprising:
a processing device; and
memory including a market place manager which has instructions that are executed by the processing device, the instructions including the following logics of:
storing product information related to at least one product in a database, wherein the product information includes a product identification number;
generating and storing at least one unique user ID of a user in the database based on receiving a user input from the at least one mobile app;
gathering socially and contextually relevant information associated with products created by content providers, wherein the socially and contextually relevant information includes product reviews and content images;
providing profiles of the content providers on an online marketplace, wherein each profile includes a product bag that includes products that a content provider added to the product bag, a review folder that includes product reviews that the content provider has published on the online marketplace, and a looks folder that includes content images of the content provider with the products; and
providing a content feed that displays a list of gathered socially and contextually relevant information created by the content providers;
tracking and storing at least one product engaging activity in the database based on the user input from the at least one mobile app;
wherein the product engaging activity refers to an activity at the mobile app that includes receiving the user input that reflects a user engaging with the at least one product,
wherein the product engaging activity includes at least one of the following activities: browsing, providing and/or receiving images, videos, blogging, podcast, documents, a rich site summary, a "like" comment from selecting a "like" button, a review of a product, a sharing or a suggesting of a product to another user, and purchasing of a product, and
wherein the logic of tracking the at least one product engaging activity is accomplished by the market place server tracking the number of times that the product engaging activity is performed, associating the tracked number of times that the product engaging activity is performed with the at least one unique user ID, and associating the tracked number of times that the product engaging activity is performed with the product identification number in connection with the product information related to the at least one product; and
configuring the stored product information to be associated with the at least one product at the at least one mobile app, wherein the at least one product is selectable by a user input for placing the selected product in an online shopping cart, wherein the online shopping cart facilitates an in-app purchase of the selected at least one product.

15. The market place server as defined in claim 14, wherein the market place manager has instructions that include the logics of:
creating a user profile that is associated with the at least one unique user ID;
associating the user profile with the at least one product engaging activity and the at least one product that has been purchased or is intended to be purchased based on the user input from the mobile app; and
providing searching options for the at least one product engaging activity that enables the mobile app to search the at least one product from the database or the at least one product that is associated with the user profile.

16. The market place server as defined in claim 15, wherein the market place manager has instructions that include the logics of:
retrieving a stored content that is associated with the at least one product from the database or from the user profile;
displaying the retrieved content and a shopping cart button at the retrieved content;
responsive to selecting the shopping cart button, placing the at least one product that is associated with the content in the online shopping cart.

17. The market place system as defined in claim 14, wherein the market place manager has instructions that further include the logics of:
awarding at least one reward to an account of the user based on the tracked product engaging activities.

18. A market place application that is stored in a non-transitory computer-readable storage memory and has instructions that are executed by a processing device, the instructions including the following logics:
storing product information related to at least one product in a database, wherein the product information includes a product identification number;
generating and storing at least one unique user ID of a user in the database based on receiving a user input from at least one mobile app;
gathering socially and contextually relevant information associated with products created by content providers, wherein the socially and contextually relevant information includes product reviews and content images;
providing profiles of the content providers on an online marketplace, wherein each profile includes a product bag that includes products that a content provider added to the product bag, a review folder that includes product reviews that the content provider has published on the online marketplace, and a looks folder that includes content images of the content provider with the products; and providing a content feed that displays a list of gathered socially and contextually relevant information created by the content providers;

tracking and storing at least one product engaging activity in the database based on the user input from the at least one mobile app;

wherein the product engaging activity refers to an activity at the mobile app that includes receiving the user input that reflects a user engaging with the at least one product, wherein the product engaging activity includes at least one of the following activities: browsing, providing and/or receiving images, videos, blogging, podcast, documents, a rich site summary, a "like" comment from selecting a "like" button, a review of a product, a sharing or a suggesting of a product to another user, and purchasing of a product, and wherein the logic of tracking the at least one product engaging activity is accomplished by a market place server tracking the number of times that the product engaging activity is performed, associating the tracked number of times that the product engaging activity is performed with the at least one unique user ID, and associating the tracked number of times that the product engaging activity is performed with the product identification number in connection with the product information related to the at least one product; and configuring the stored product information to be associated with the at least one product at the at least one mobile app, wherein the at least one product is selectable by a user input for placing the selected product in an online shopping cart, wherein the online shopping cart facilitates an in-app purchase of the selected at least one product.

19. The market place application as defined in claim 18, wherein the instructions include the logics of:

creating a user profile that is associated with the at least one unique user ID;

associating the user profile with the at least one product engaging activity and the at least one product that has been purchased or is intended to be purchased based on the user input from the mobile app; and providing searching options for the at least one product engaging activity that enables the mobile app to search the at least one product from the database or the at least one product that is associated with the user profile.

20. The market place application as defined in claim 19, wherein the instructions include the logics of:

retrieving a stored content that is associated with the at least one product from the database or from the user profile;

displaying the retrieved content and a shopping cart button at the retrieved content;

responsive to selecting the shopping cart button, placing the at least one product that is associated with the content in the online shopping cart.

* * * * *